United States Patent [19]
Yamada

[11] Patent Number: 5,315,971
[45] Date of Patent: May 31, 1994

[54] LUBRICATING OIL SUPPLYING DEVICE FOR ENGINE

[75] Inventor: Seiichiro Yamada, Iwata, Japan

[73] Assignee: Yamaha Hatsudoki Kabushiki Kaisha, Iwata, Japan

[21] Appl. No.: 895,919

[22] Filed: Jun. 9, 1992

[30] Foreign Application Priority Data

Jul. 15, 1991 [JP] Japan .................. 3-201297

[51] Int. Cl.$^5$ .................. F01M 1/16; F16N 27/00
[52] U.S. Cl. .................. 123/196 R; 123/73 AD; 417/274; 417/437; 184/7.4
[58] Field of Search ....... 123/196 R, 196 W, 196 CP, 123/73 AD; 184/7.4; 417/274, 437

[56] References Cited

U.S. PATENT DOCUMENTS

| | | | |
|---|---|---|---|
| 2,253,152 | 8/1941 | Towler et al. | 417/437 |
| 3,302,752 | 2/1967 | Shikawa | 184/6 |
| 3,938,425 | 2/1976 | Kroffke | 417/274 |
| 4,383,504 | 5/1983 | Walsworth | 123/73 AD |
| 4,533,301 | 8/1985 | Foster | 417/437 |
| 4,539,949 | 9/1985 | Walsworth | 123/73 AD |
| 4,551,076 | 11/1985 | Dubois | 123/73 AD |
| 4,715,791 | 12/1987 | Berlin et al. | 417/274 |
| 4,944,658 | 7/1990 | Büttner | 417/274 |

FOREIGN PATENT DOCUMENTS

| | | |
|---|---|---|
| 0376815 | 7/1990 | European Pat. Off. |
| 1400280 | 4/1965 | France |
| 62-258111 | 10/1987 | Japan |
| 2151313 | 7/1985 | United Kingdom |

Primary Examiner—E. Rollins Cross
Assistant Examiner—Erick Solis
Attorney, Agent, or Firm—Knobbe, Martens, Olson & Bear

[57] ABSTRACT

Embodiments of lubricant pumps for machines wherein the pump comprises a pumping plunger slidably supported within a bore. The quantity of lubricant delivered during a stroke of the pumping plunger is adjusted by means of a stop plunger which is mounted within the bore and which is contacted by the pumping plunger for limiting its degree of movement. In this way it is possible to maintain a minimum clearance volume under all conditions of stroke of the pumping plunger. Both mechanical and electrical drives for the pumping plunger are disclosed. In two embodiments of the invention, the stop plunger is controlled in response to the operation of the throttle valve of the engine. In two other embodiments the amount of lubricant pump is dependent upon speed of the engine but a connection to the throttle control is not employed and the operation is such that non-linear relationships between engine speed and amount of lubricant pump may be employed.

50 Claims, 14 Drawing Sheets

LUBRICATING OIL SUPPLYING DEVICE FOR ENGINE

BACKGROUND OF THE INVENTION

This invention relates to a lubricating oil supplying device for an engine and more particularly to an improved lubricating pump for a machine such as an engine.

One form of lubricating system employed within internal combustion engines and particularly two cycle engines employs a reciprocating plunger type pump that is driven by the engine and supplies a finite amount of lubricant during each stroke of the pump. Of course, it is desirable to vary the output of the pump or the amount of lubricant delivered to the engine during each pump stroke so as to insure against excess lubrication and the disadvantages accompanying it. That is, it is desirable to insure against the supply of excess lubricant so as to avoid exhaust smoke and the emission of unburned hydrocarbons. A number of arrangements have been employed for controlling the amount of lubricant delivered to the engine during each pumping stroke.

One way in which the amount of lubricant may be controlled is by changing the effective stroke of the plunger. This has conventionally been done in the past by providing some form of adjustable stop that cooperates with a portion of the plunger which is always exposed from the bore in which the plunger reciprocates. There are a number of disadvantages to such an arrangement.

One disadvantage with this type of arrangement is that the clearance volume of the pump at top dead center of the plunger will then vary as the amount of lubricant pump is changed. That is, as the plunger stroke is adjusted, the clearance volume increases as the amount of lubricant is decreased. Having large clearance volumes presents a number of disadvantages. The primary disadvantage is that the larger the clearance volume, the more likely it is for air to be drawn into the pumping chamber during operation. This will give rise to variations in the amount of lubricant actually delivered and a decrease in the effectiveness of the pump.

In addition, with this type of pumping mechanism the plunger is supported in a blind bore. Therefore, it is necessary to provide some clearance at the end of the plunger stroke, even when the maximum amount of lubricant is being delivered. This must be done to insure against interference between the head of the plunger and the blind end of the bore. Thus, it is not possible under any condition to maintain minimum clearance volume with this type of pump stroke adjustment.

It is, therefore, a principal object of this invention to provide an improved arrangement for varying the output of a reciprocating plunger type of pump without changing the clearance volume of the pump at top dead center.

It is a further object of this invention to provide an improved arrangement for controlling the pumping stroke of a plunger type pump while maintaining zero clearance volume at top dead center regardless of the amount of lubricant being pumped.

It is a further object of this invention to provide an improved plunger type of lubricant pump wherein the plunger can reciprocate in an open as opposed to a blind bore.

The quantity of lubricant delivered to the engine is normally varied in response to an engine condition, most typically engine speed. The conventional types of systems, including those of the prior art as previously mentioned, adjust the stroke of the pump plunger in response to the setting of the speed controlling unit of the engine, such as the throttle valve. Normally this is done by providing a mechanical connection between the throttle valve or its controlling mechanism and the stop which changes the plunger stroke. As a result, these devices generally vary the amount of lubricant linearally with respect to engine speed. Devices have been incorporated, however, for changing this linearity somewhat in response to transient conditions, but the overall control is generally linear. However, the lubricant demands of the engine are not always linearly related to the engine condition.

It is, therefore, a further principal object of this invention to provide an arrangement for varying the amount of lubricant pumped to an engine in response to a condition of the engine without sensing directly that condition or the control for that engine condition so as to permit the desired delivery to be achieved.

It is a further object of this invention to provide an arrangement for controlling the amount of lubricant delivered to a machine by a lubricant pump in response to an machine condition without having the amount of lubricant necessarily be supplied in a linear fashion.

Another disadvantage of the type of lubricant control as aforedescribed is that the mechanical connection between the engine speed control and the lubricant pump also gives rise to mechanical loadings in the system which will change the operator's "feel" of the control of which he is attempting to effect. That is, if the pump output is adjusted in response to position of the throttle controlling member, then the feedback from the mechanical control to the pump adjustment will interfere with the operator's feel for the condition of the throttle valve. In addition, such arrangements add to the load which the operator must exert on the control in order to achieve the control of both the engine and the amount of lubricant supplied.

It is, therefore, a further object of this invention to provide an arrangement for controlling the amount of lubricant supplied to a machine in response to a condition of the machine without necessitating a mechanical control to the mechanism which varies the machine condition.

Another disadvantage of the prior art type of systems wherein there is a mechanical connection between the pump output controlling member and the member that controls the engine condition is that the prior art devices generally can vary the amount of lubricant only with respect to that particular condition. For example, if the control is related to the engine throttle control, then the devices generally can vary the amount of lubricant only in response to throttle control position. However, the amount of lubricant required by the engine may vary in response to other conditions than merely throttle position. Although the prior art mechanisms have permitted some minor adjustment, primarily for transient conditions, they have not been able to accommodate changes in lubrication for conditions in addition to the main sensed condition.

It is, therefore, a still further object of this invention to provide an arrangement for controlling the amount of lubricant supplied to an engine in response to engine speed and another condition, such as temperature.

SUMMARY OF THE INVENTION

A first feature of this is adapted to be embodied in a lubricant pump for lubricating a machine. The pump has a cylinder member that defines a bore and a pumping plunger is reciprocally supported in the bore at one end thereof. Means are provided for reciprocating the pump plunger within the bore. The pump plunger and bore define a pumping chamber to which fluid is admitted and discharged through appropriate inlet and discharge means. A stop member is movably supported within the bore from the opposite end thereof for limiting the stroke of the pump plunger to vary the stroke and the amount of lubricant pumped.

Another feature of this invention is adapted to be embodied in a lubricant pump for a machine comprised of a member defining a bore with a pumping plunger reciprocating in the bore. Supply means admit fluid to the bore upon a suction stroke of the pumping plunger and delivery means deliver fluid from the bore upon a pumping stroke of the plunger member. Stop means are provided for limiting the stroke of the pump plunger and means are provided for operating the stop means in response to a condition other than a machine condition and a means for controlling such machine condition so as to vary the amount of lubricant supplied to the machine in response to the machine condition in a preferred relationship.

A still further feature of the invention is adapted to be embodied in a lubricant pump for a machine that is comprised of a member defining a bore in which a pumping plunger reciprocates. Supply means admit fluid to the bore upon a suction stroke of the pumping plunger and delivery means deliver fluid from the bore upon a pumping stroke of the pumping plunger. Stop means are provided for limiting the stroke of the pumping plunger for varying the amount of lubricant supplied to the machine. Means are provided for operating the stop means in response to a condition of the machine and a further condition other than that machine condition for varying the amount of lubricant supplied to the machine in response to both the machine condition and the other condition.

DETAILED DESCRIPTION OF THE PREFERRED EMBODIMENTS OF THE INVENTION

Figure 1:
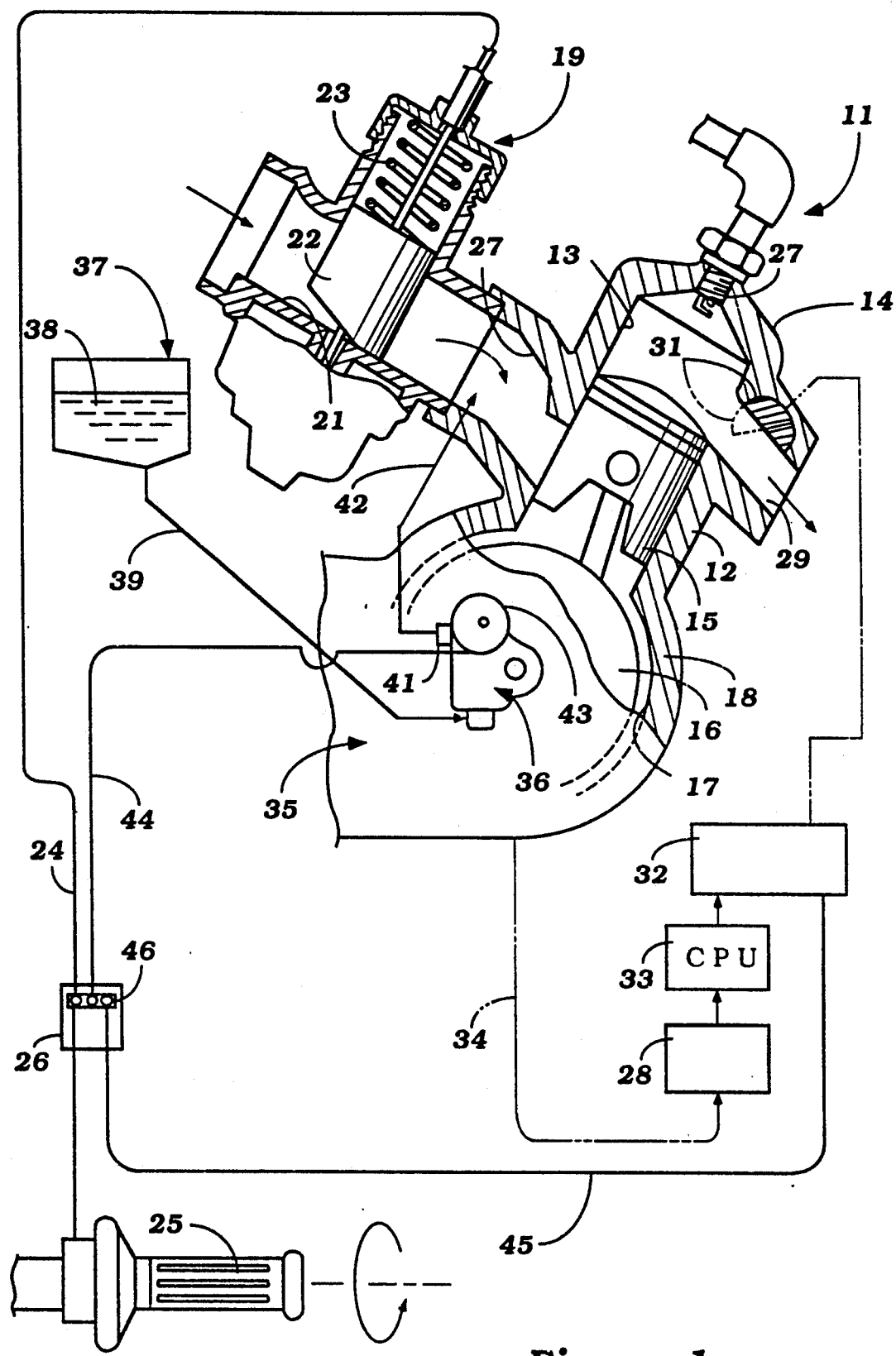
FIG. 1 is a partially schematic side elevational view of a motorcycle engine and control therefore, with a portion broken away and shown in section, and having a lubricating system and lubricating pump constructed in accordance with an embodiment of the invention.

Referring first to FIG. 1, a motorcycle engine having a lubricating system constructed in accordance with an embodiment of the invention as shown partially and has portions broken away and identified generally by the reference numeral 11. The invention is described in conjunction with a motorcycle application because motorcycles frequently employ two cycle internal combustion engines and this invention has particular utility in conjunction with such engines. It is to be understood, however, that the invention may be employed in lubricating systems for other types of engines or, for the matter, in lubricating systems for other types of machines.

The engine 11 includes a cylinder block 12 having a cylinder bore 13 which is closed at one end by a cylinder head 14 and in which a piston 15 reciprocates. The piston 15 drives a crankshaft 16 rotatably journaled within a crankcase chamber 17 formed by the lower portion of the cylinder block 12 and a crankcase member 18 that is affixed in a suitable manner to the cylinder block.

As has been noted, the engine 11 operates on the two cycle principal and is of the crankcase compression type. A charge is delivered to the crankcase chamber 17 from an induction system that includes a carburetor 19. The carburetor 19 has an intake passage 21 in which a sliding throttle piston 22 is provided. The throttle piston 22 is normally biased towards its idle position by means of a coil compression spring 23. A throttle control cable 24 is connected to a hand grip throttle control 25 by means including a connector 26.

Air is drawn into the carburetor intake passage 21 through an air cleaner and air silencer (not shown) and flows in the direction of the arrows to an intake passage 27 formed in the cylinder block 12 and which communicates with the crankcase chamber 17 during the reciprocation of the piston 15, as is well known in this art.

The charge which is drawn into the crankcase chamber 17 during the upward movement of the piston 15 is compressed as the piston 15 descends in the cylinder bore 13. This compressed charge is then transferred to the combustion chamber formed above the end of the piston 15 through one or more scavenge passages (not shown) in a manner well known in this art. This charge is then further compressed in the combustion chamber as the piston 15 moves upwardly and is fired by means of a spark plug 27 mounted in the cylinder head 14. The spark plug 27 is fired by an ignition system, indicated generally by the block 28 and which may be of any known type.

An exhaust passage 29 is formed in the cylinder block 12 and has positioned within it an exhaust control valve 31 which is operated by means of a servo motor 32 so as to change the timing of the opening and closing of the exhaust passage 29. The exhaust control valve 31 is employed for retarding the opening of the exhaust port 29 under low and mid-range speeds as shown in the phantom line view of FIG. 1 and to provide advanced opening of the exhaust passage 29 under high speed operation. A CPU 33 is provided for controlling both the servo motor 32 and the firing of the spark plug 27 by the ignition system 28.

A engine speed and crank angle sensor, indicated by the phantom line 34 inputs a signal to the ignition system 28 and the CPU 33 so as to provide a speed and crank angle position for these members. Any other inputs may be supplied to the CPU 33 for its operation such as throttle position sensors, etc.

The foregoing description of the engine 11 is only for reference purposes because, as has been noted, the invention may be employed in conjunction with various types of machines including two cycle crankcase compression internal combustion engines. Therefore, any details of the construction as thus far described may be considered to be conventional and, for that reason, further discussion of the basic engine construction is not believed to be necessary to understand the construction and operation of the invention.

The invention deals primarily with the lubricating system for the engine which lubricating system is indicated generally by the reference numeral 35 and specifically to the lubricating pump therefore, indicated generally by the reference numeral 36. Lubricant is supplied to the lubricating pump 36 from a remote lubricant reservoir 37 in which a quantity of lubricant 38 is contained. The lubricant reservoir 37 is positioned vertically above the lubricant pump 36 and supplies lubricant thereto by gravity through a line 39. The lubricant pump 36 has a discharge fitting 41 that delivers lubricant to the engine 11 for its lubrication through a lubricant supply conduit, indicated generally by the reference numeral 42. In the illustrated embodiment, the engine 11 is lubricated by spraying lubricant from the pump 36 into the intake port 27. It is to be understood, however, that the lubricant may be supplied to the engine 11 at one or more locations, as is well known in the art.

The amount of lubricant delivered by the lubricant pump 36 is changed in response to engine operating conditions and a lubricant quantity controlling pulley 43 is associated with the lubricant pump 36 in a manner to be described so as to vary the stroke of the pump 36 and, accordingly, the amount of lubricant delivered. The pulley 43 is operated by means of a Bowden wire cable 44 that is connected to the connector 26. In addition, a wire transmitter 45 is also connected to a member 46 of the connector 26 so that the amount of lubricant supplied will be generally responsive to the position of the throttle control 25 but during transient conditions there will be some delay before the amount of lubricant supplied is changed. The connector 26 is of the type shown in Japanese published application 62-178707 published Aug. 5, 1987. Of course, other types of controls for varying the position of the pulley 43 may be incorporated.

The lubricant pump 36 will now be described in greater detail by reference to FIGS. 2 through 7. The pump assembly 36 is comprised of a main housing piece 47 which is formed from a light weight material such as aluminum or aluminum alloy. The housing piece 46 is provided with a flange 48 so that it can be attached to the crankcase 18 of the engine in driving relationship with the crankshaft 16, in a manner which will be described.

The main housing piece 48 is provided with an internal cavity that is defined by a cylindrical bore 49 and a lower cavity portion 51. The lower cavity portion 51 is closed by means of a cover plate 52 that is affixed to the main housing 47 by means of a plurality of threaded fasteners 53. The upper end of the bore 49 is covered by means of a second closure plate 54 which is affixed to the main body portion 47 in a suitable manner as by fasteners 50 (FIG. 5) and which defines an internal cavity in which the pump stroke adjusting mechanism, indicated generally by the reference numeral 55, is provided.

A sleeve 56 having a through bore 57 is rotatably journaled in the main housing bore 49. The sleeve 56 may also be formed from a light weight material such as aluminum or an aluminum alloy. The sleeve 56 is rotatably driven in the bore 49 by means of a worm gear assemblage, indicated generally by the reference numeral 58 and which includes a worm 59 that is formed integrally with a shaft 61 that has a suitable driving connection with the crankshaft 16.

The worm 59 drives a worm wheel 62, formed from a resinous plastic material has a driving connection with the sleeve 56 which is provided for by means of a pin 63. The worm wheel 62 is engaged at its upper end with a shoulder 64 formed by the main housing 47 and is engaged at its lower ends by upstanding bosses 65 of the cover piece 52. In this way, the worm wheel 62 and sleeve 56 are axially positioned within the main housing assembly 47.

As has been noted, the sleeve 56 has a through bore and the axis of this bore is indicated by the line 66. This axis 66 is coaxial with the axis of the bore 49 and a pump plunger 67 is slidably supported in the lower end of this bore. The pump plunger 67 has affixed to its lower end a cross pin 68 that is received in a gap 69 formed by the upstanding bosses 65 of the cover piece 52. As a result, the pump plunger 67 will be held against rotations by the bosses 65 but may reciprocated within the bore of the sleeve 56.

Reciprocation of the pump plunger 67 is effective by means of a pair of driving cams 71 formed on the lower surface of the worm wheel 62. These cam surfaces 71 have a generally truncated configuration so that as the worm wheel 62 rotates, the pump plunger 67 will complete two strokes per revolution.

A coil compression spring 72 is provided in the cover plate 52 and acts against the drive pin 68 so as to normally urge the drive pin 68 upwardly into engagement with the drive cams 71 and also to urge the pump plunger 67 to an upward position. The direction of rotation of the worm wheel 62 is indicated by the arrow "A" in FIG. 2.

As should be obvious, the downward stroke of the pumping plunger 67 is controlled by the height of the driving cams 71. This will determine the bottom dead center position of the pumping plunger 67. The upward movement of the pumping plunger 67 is, however, controlled by the spring 72 and by the stroke adjusting mechanism 55. This stroke adjusting mechanism 55 will now be described in detail by reference primarily to FIGS. 2, 5 and 6.

The stroke limiting mechanism 55 includes an adjusting plunger 73 that is slidably supported in the bore of the sleeve 56 opposite to the pumping plunger 67. The adjusting plunger 73 is urged by a mouse trap type spring 74 into engagement with a stroke adjusting cam 75 having a generally snail like configuration. The adjusting cam 75 is connected for rotation with a camshaft 76 that includes a shaft element 77 by means of a drive pin 78. The drive pin 78 is restrained within a bore formed in the adjusting cam 75 and a corresponding bore in the shaft 77 by means of an 0 ring 79. It should be noted, and as clearly shown in FIG. 6, that this driving connection permits the adjusting cam 75 to be shifted transversely relative to the camshaft 77 for adjusting purposes, as will be described.

The camshaft 77 is drivingly coupled to the pulley 43 by means of a drive pin 81. A torsional spring 82 is loaded between the pulley 43 and the cover plate 54 for normally urging the camshaft 77 and stroke adjusting cam 75 in a direction to force the adjusting plunger 73 to a downward, stroke limiting position. Direction is indicated by the arrow "B" in FIGS. 2 and 6.

The extreme lower position of the adjusting plunger 73 when the cam 75 is rotated to its maximum limiting position is controlled by means of an adjusting mechanism, indicated generally by the reference numeral 83. This adjusting mechanism 83 includes a further shaft 84 which is journaled within a bore 85 of the cover piece 54 which bore 85 is co-axial with the axis of rotation of the shaft 77. The adjusting shaft 84 has an internal bore 86 which is also co-axial with this shaft and in which a pilot portion of the camshaft 77 is received. The adjusting shaft 84, however, has an eccentric portion 87 that is received within a bore 88 of the cam 75. Thus, by rotating the adjusting shaft 87 relative to the cover plate 54 it is possible to adjust the minimum stroke of the pumping plunger 67 so as to adjust the amount of lubricant delivered under idle conditions.

The adjusting shaft 84 is locked in its adjusted position by means of a clamping plate 89 and lock screw 91 fixed in the cover plate 54.

Figure 2:
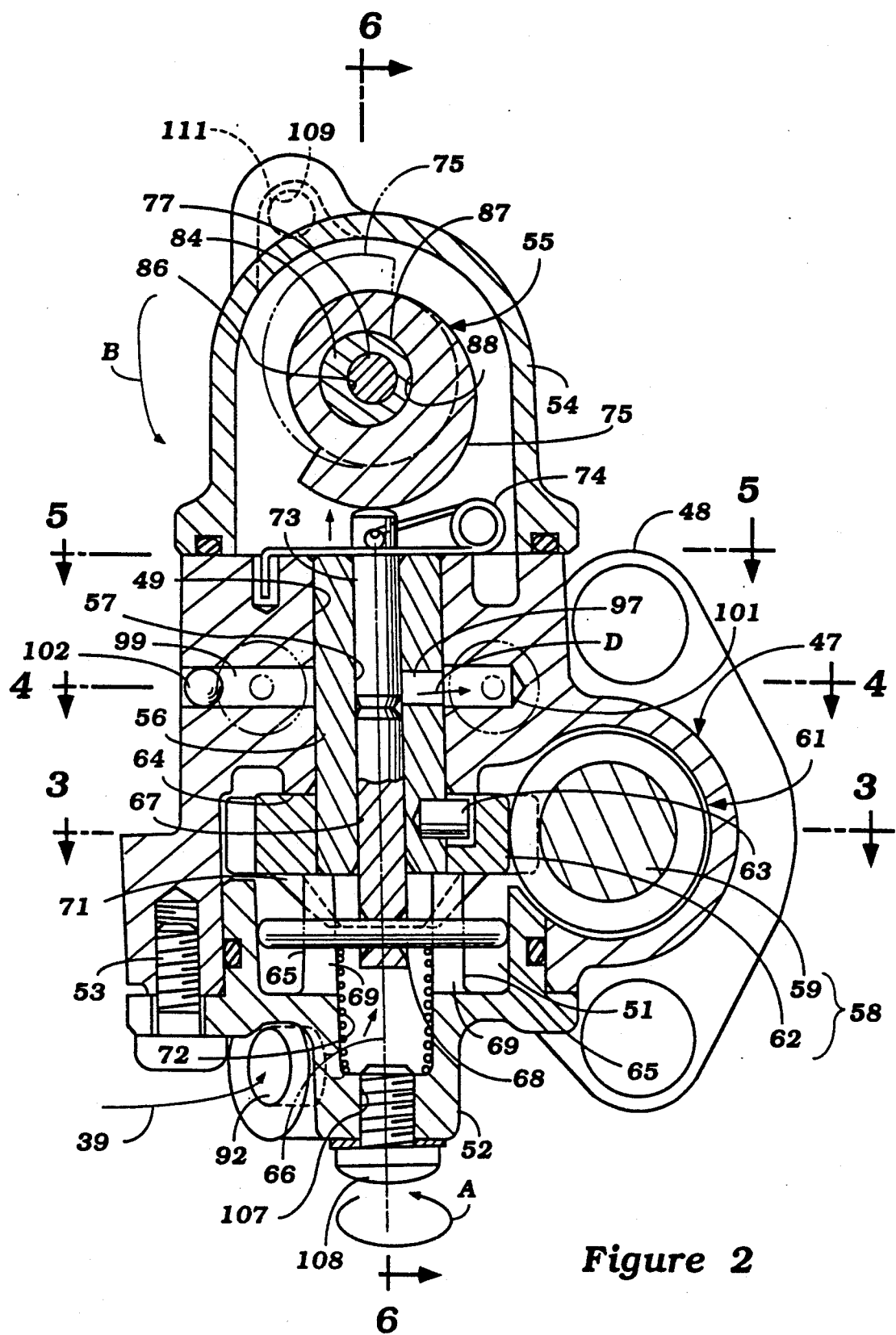
FIG. 2 is an enlarged cross sectional view of the lubricant pump taken along a plane parallel to the plane of FIG. 1.
Figure 3:
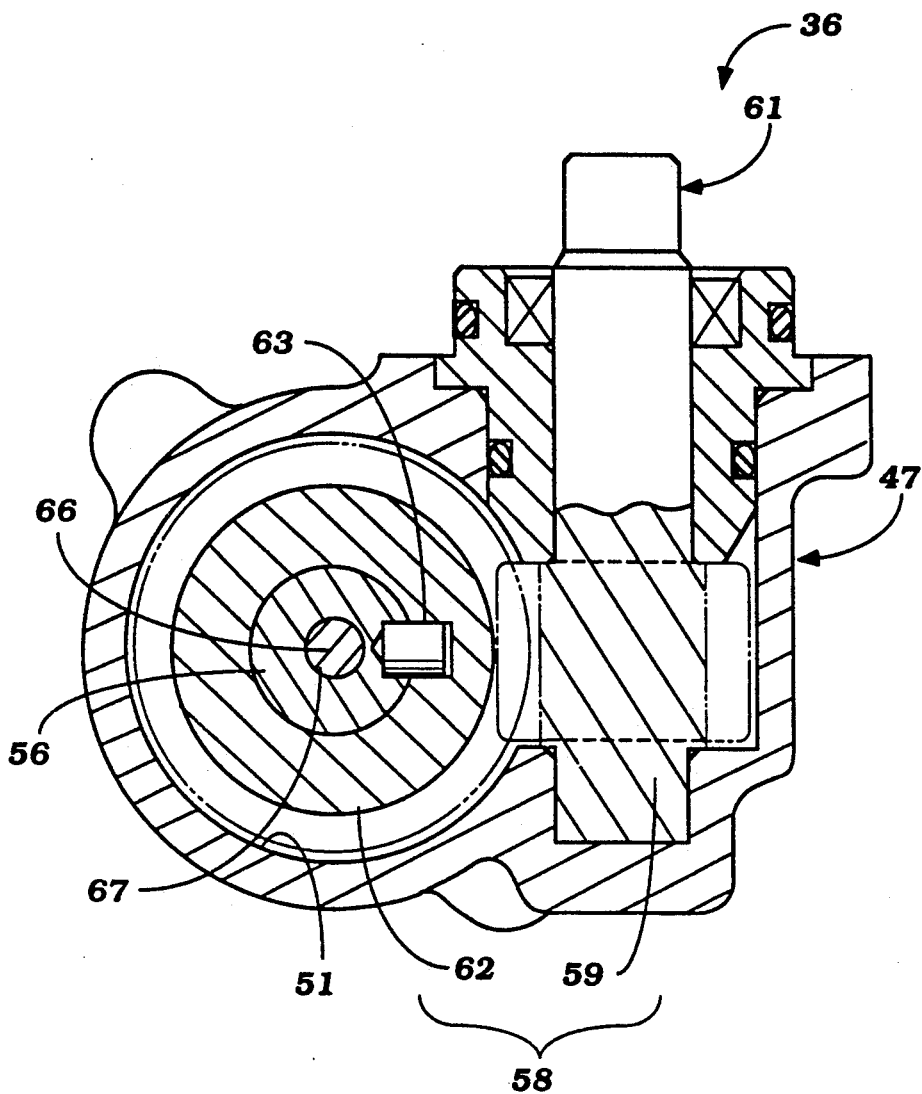
FIG. 3 is a cross sectional view taken along the line 3—3 of FIG. 2.
Figure 4:
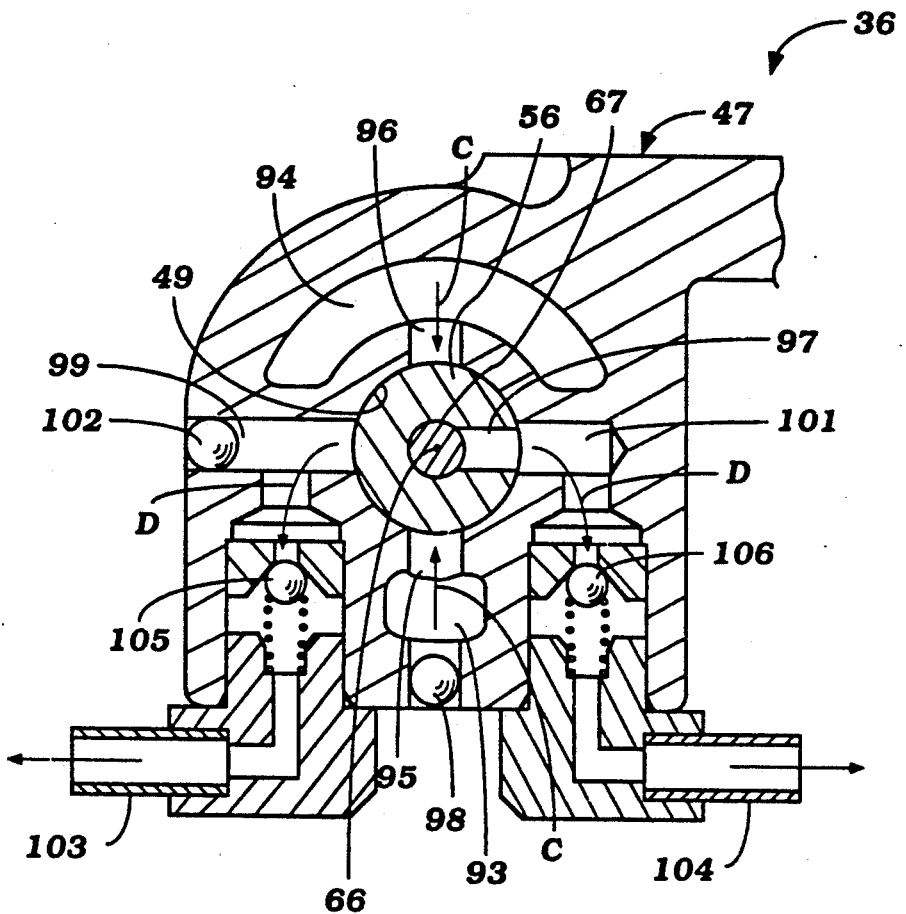
FIG. 4 is a cross sectional view taken along the line 4—4 of FIG. 2.
Figure 5:
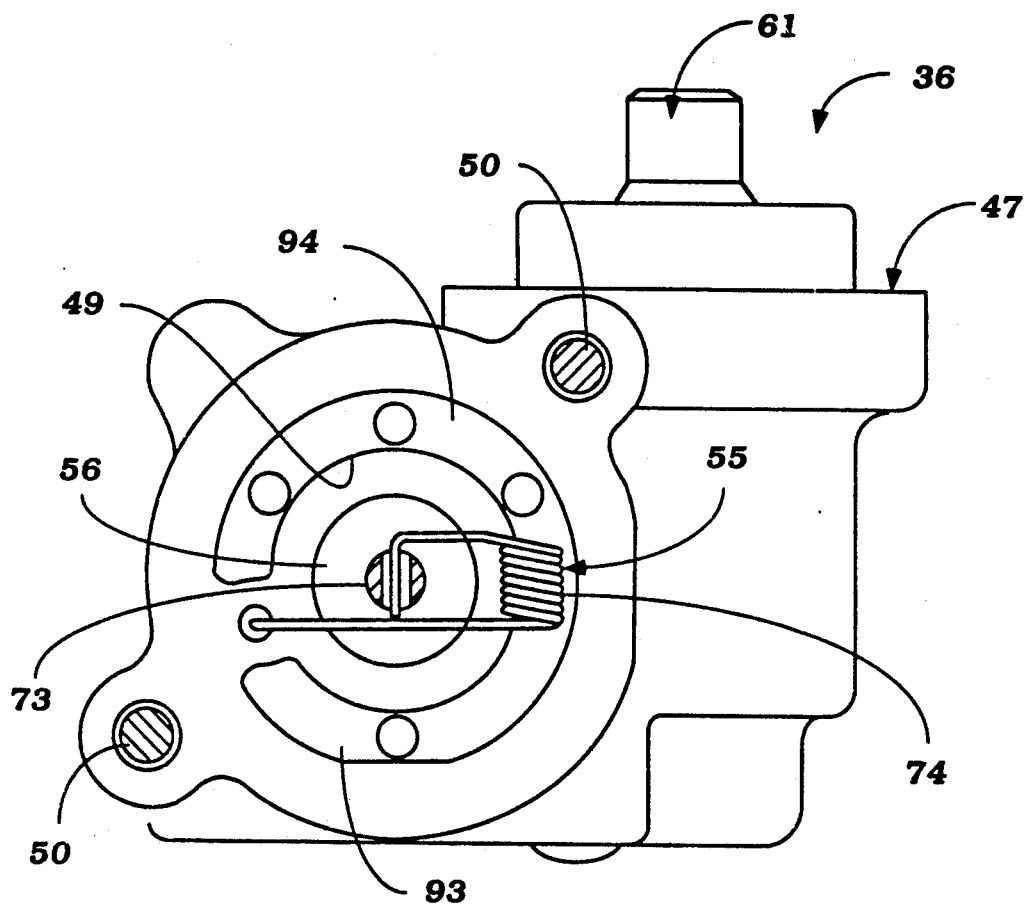
FIG. 5 is a cross sectional view taken along the line 5—5 of FIG. 2.
Figure 6:
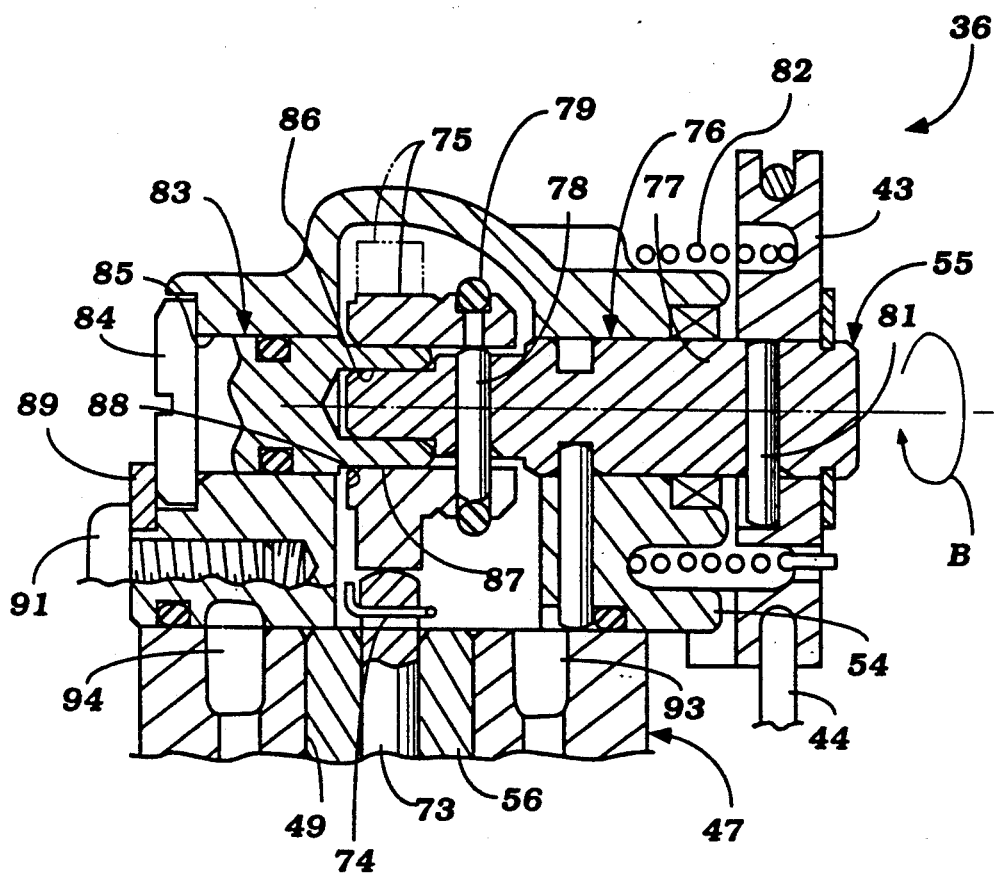
FIG. 6 is a partial cross sectional view taken generally along the line 6—6 of FIG. 2.
Figure 7:
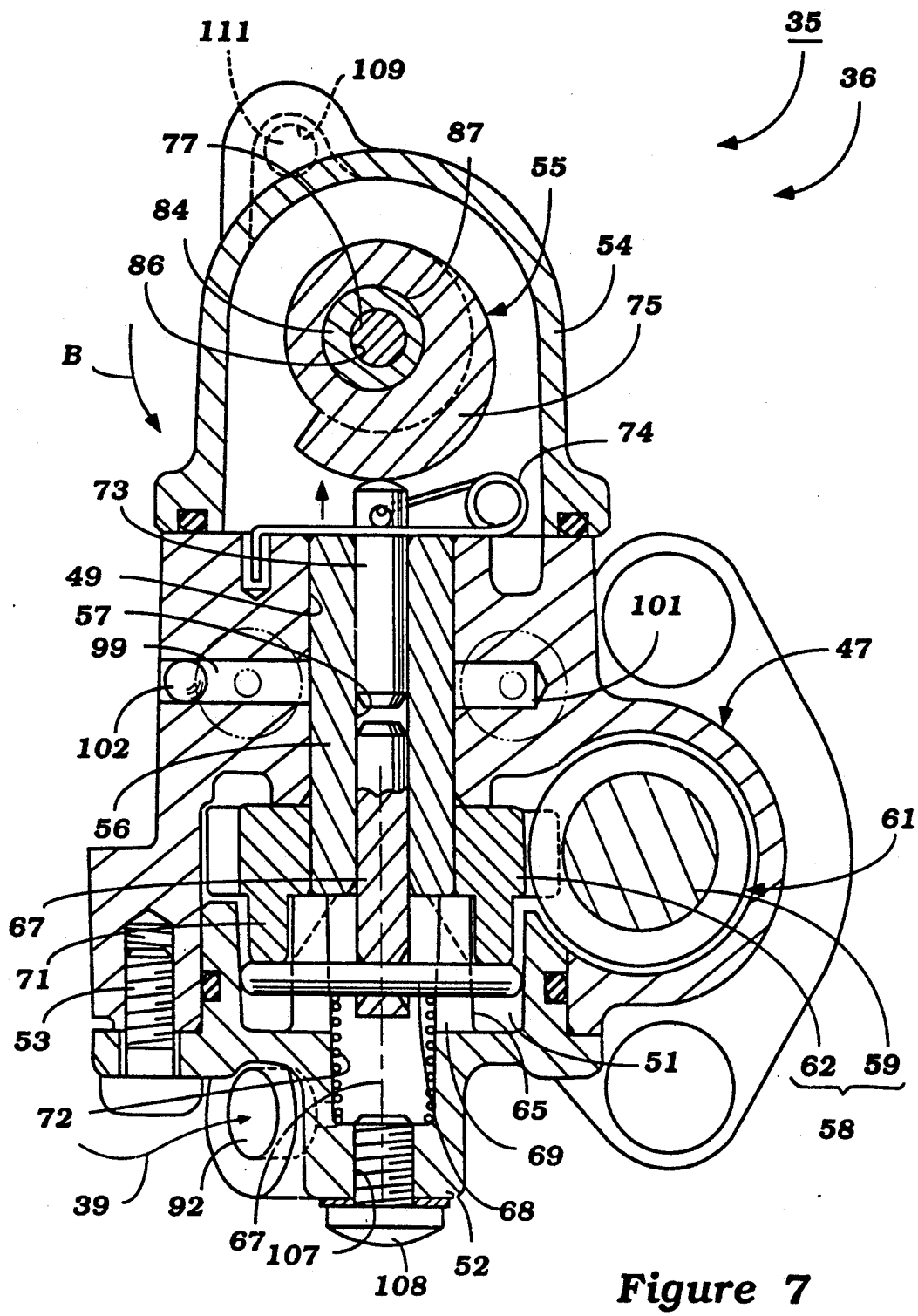
FIG. 7 is a cross sectional view, in part similar to FIG. 2, and shows another phase of the pump operation.

Fluid flow through the pump 36 will now be described by particular reference to FIGS. 2 and 4. As has been noted, the conduit 39 supplies lubricant to the pump 36 from the reservoir 37. To this end, the lower cover plate 52 is provided with an inlet opening 92 by which fluid may flow into the chamber 51. A pair of vertically extending delivery passages 93 and 94 are formed in the main housing 47 (FIG. 4) which extend upwardly around the sides of the sleeve 56. Radially extending ports 95 and 96 are provided in the housing 47 and extend to the bore 49. The sleeve 56 is provided with a distributor passage 97 which will sequentially register with the supply ports 95 and 96 as the sleeve 56 rotates. This registration is accomplished at the time when the pumping plunger 67 is moving downwardly under the operation of the drive cam 71 so that fluid will be drawn into the pumping chamber 57 upon this downward movement of the pumping plunger 67. This direction of flow is indicated by the arrows "C" in FIG. 4.

It may be seen that the supply passages 95 and 96 may be easily formed by drilling through one face of the housing assembly 47 when the sleeve 56 is not in place with this drilled passageway intersecting the supply passages 93 and 94. A ball type plug 98 is then inserted into this drilling to close the passages.

A pair of delivery passages 99 and 101 are also formed in the housing member 47 by a similar drilling that extends at ninety degrees (90°) to the drilling which forms the supply passages 95 and 96. This drilling is then closed by a ball type plug 102.

The supply passages 99 and 101 are intersected by further passages in which supply fittings 103 and 104 are provided with ball type check valves 105 and 106 controlling the communication of the delivery passages 99 and 101 with the fittings 103 and 104, respectively. Fluid will be pumped through the passages 99 and 101 when they register with the distributor passage 97 of the sleeve 56 upon its rotation as shown by the arrows "D" in FIG. 4.

The fittings 103 and 104 cooperate with the outlet fitting 41 as previously described so as to supply the lubricant to the engine.

The cover plate 52 (FIG. 2) is provided with a drain opening 107 which is normally closed by drain plug 108. By removing the drain plug 108 lubricant may be drained from the pump assembly 36. In addition the cover plate 54 is provided with a vent opening 109 which is normally closed by a vent plug 111. Air may be bled from the pump assembly 36 by loosening the plug 111 until lubricant flows out of the vent opening 109 and then the plug 111 may be re-tightened. If the pump 36 is operated in an inverted condition, the function of the drain 108 and vent plugs 111 will obviously be reversed.

It should be noted that because the plungers 67 and 73, sleeve 56 and main housing member 47 are all formed from the same material, there will be no problems of different thermal expansions and the pump can be operate quite smoothly and efficiently. Also, since the sleeve 56 is constantly rotating relative to the adjusting plunger 73, the frictional resistance to adjusting movement of the adjusting plunger 73 will be reduced and the components may be quite light in weight. Also, it is possible to use a non-metallic worm wheel 62 because of the light loading and this permits all elements to be generally light weight in construction. Furthermore, since the clearance volume 77 may be substantially zero at top dead center regardless of the amount of lubricant being pumped, the device is very effective in insuring against air intrusion into the system and excellent lubricant control may be achieved.

Figure 8:
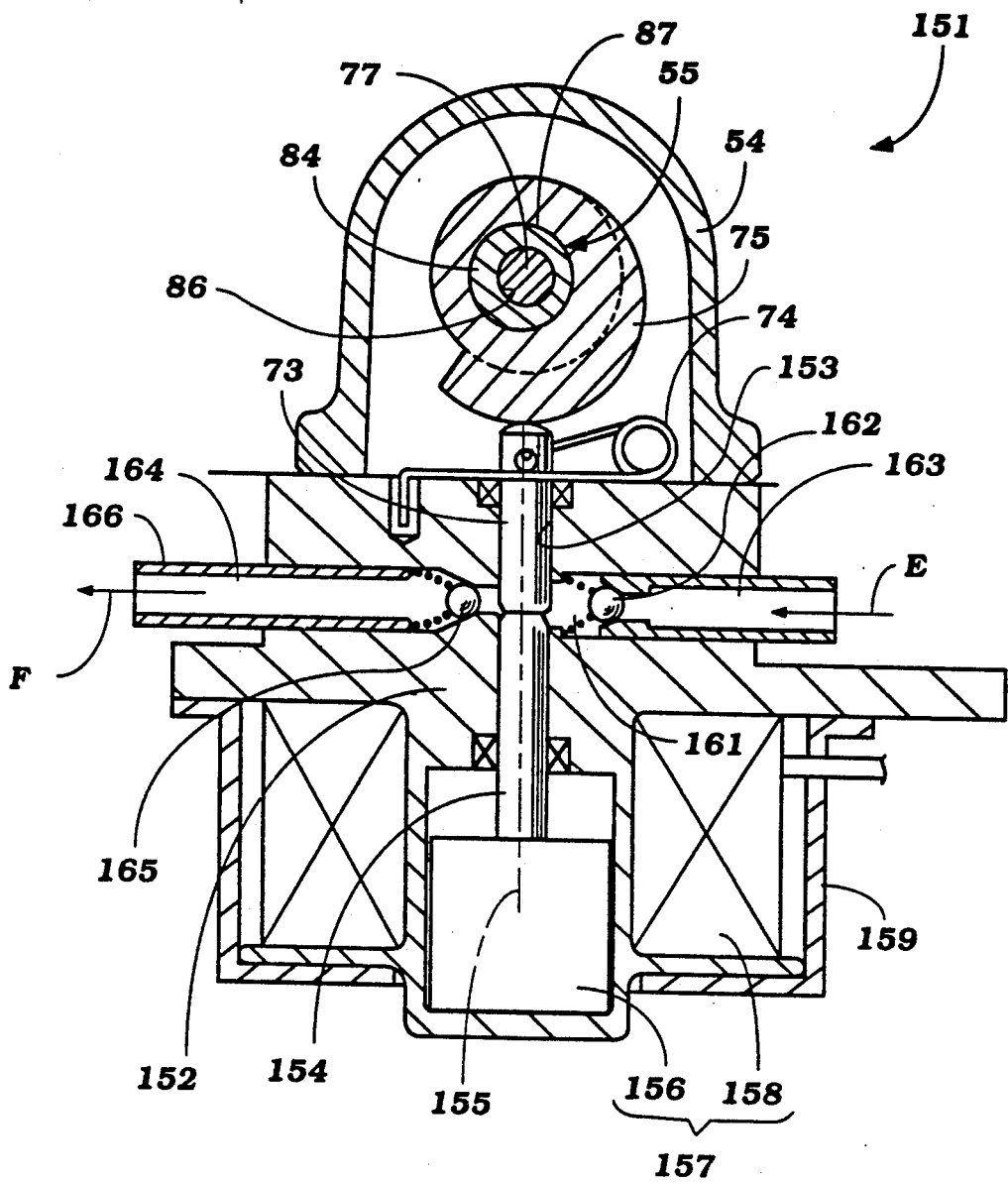
FIG. 8 is a cross sectional view, in part similar to FIG. 2, and shows another embodiment of the invention.

In the embodiment of the invention as thus far described, the pumping plunger of the lubricant pump 36 has been mechanically driven. The invention may also be employed with pumps of the type wherein the pumping plunger is electrically driven and such an embodiment is depicted in FIG. 8 wherein the pump assembly is identified generally by the reference numeral 151. In this embodiment, the means for limiting or controlling the stroke of the pumping plunger is the same as that previously described and, for that reason, those components of the pump 151 have been identified by the same reference numerals and will not be described again, except insofar as is necessary to understand the construction and operation of this embodiment.

In this embodiment, a main housing assembly 152 is provided with a bore 153 in which the adjusting plunger 73 is supported for reciprocation. In addition, a pumping plunger 154 is supported within the bore 153 and is reciprocal along an axis 155 that is co-axial with the bore 153. An armature 156 of a solenoid assembly, indicated generally by the reference numeral 157 is affixed directly to the pumping plunger 154. A solenoid winding 158 encircles the armature 155 and is contained within a cover plate 159 which is affixed to the main body portion 152 in a suitable manner.

A delivery passage 161 communicates with the bore 153 and a ball type check valve 162 is provided in the passage 161 so as to control the flow from an inlet fitting 163 in the direction of the arrow "E" from the lubricant source upon downward movement of the pumping plunger 154.

A delivery of supply passage 164 also intersects the bore 153 and is controlled by a ball type check valve 165 so that when the pumping plunger 154 moves upwardly lubricant may be discharged through a discharge or supply fitting 166 as shown in the direction of the arrow "F".

This system operates so that when the winding 158 is energized, the pumping plunger 154 will move downwardly and lubricant will be drawn into the bore 156 through the opened ball type check valve 162. At this time, the ball check valve 165 will close.

When the armature 156 is moved upwardly either by actuation of winding 158 or by a spring (not shown), the fluid contained within the bore 153 will be compressed and the ball check valve 162 will close and the ball check valve 165 will open. This upward movement continues until the pumping plunger 154 engages the adjusting plunger 173 and then pumping operation will stop. Hence, like the previously described embodiment, this device operates so as to limit the stroke of the pumping plunger while always having zero clearance volume at top dead center.

In the embodiments of the invention as thus far described, the pump stroke limiting plunger 73 has been connected by means of a Bowden wire cable to the connector 46 of the throttle control mechanism. As has been previously noted, there are certain disadvantages with such an arrangement. The first of these disadvantages is that the supply of lubricant varies in a generally linear fashion with respect to the position of the throttle pistons 22 and the hand throttle grip 25. As has been noted, the connector 26 permits some adjustment in the lubricant output during transient conditions but the general control is linear. Of course, the slope of the curve can be changed but once the slope is determined, the relationship between lubricant supply and throttle valve position is in the same ratio. This is not always desirable.

In addition, the connection from the stop plunger 73 back to the throttle control 25 gives a feedback to the operator which will interfere with the throttle feel of the control system. Furthermore, this type of mechanism does not permit adjustment in the amount of lubricant supplied in response to other conditions, such as ambient temperature.

FIGS. 9 through 14 show another embodiment of the invention wherein the disadvantages as aforenoted are avoided and yet all of the advantages of the previously described embodiments are enjoyed.

Figure 9:
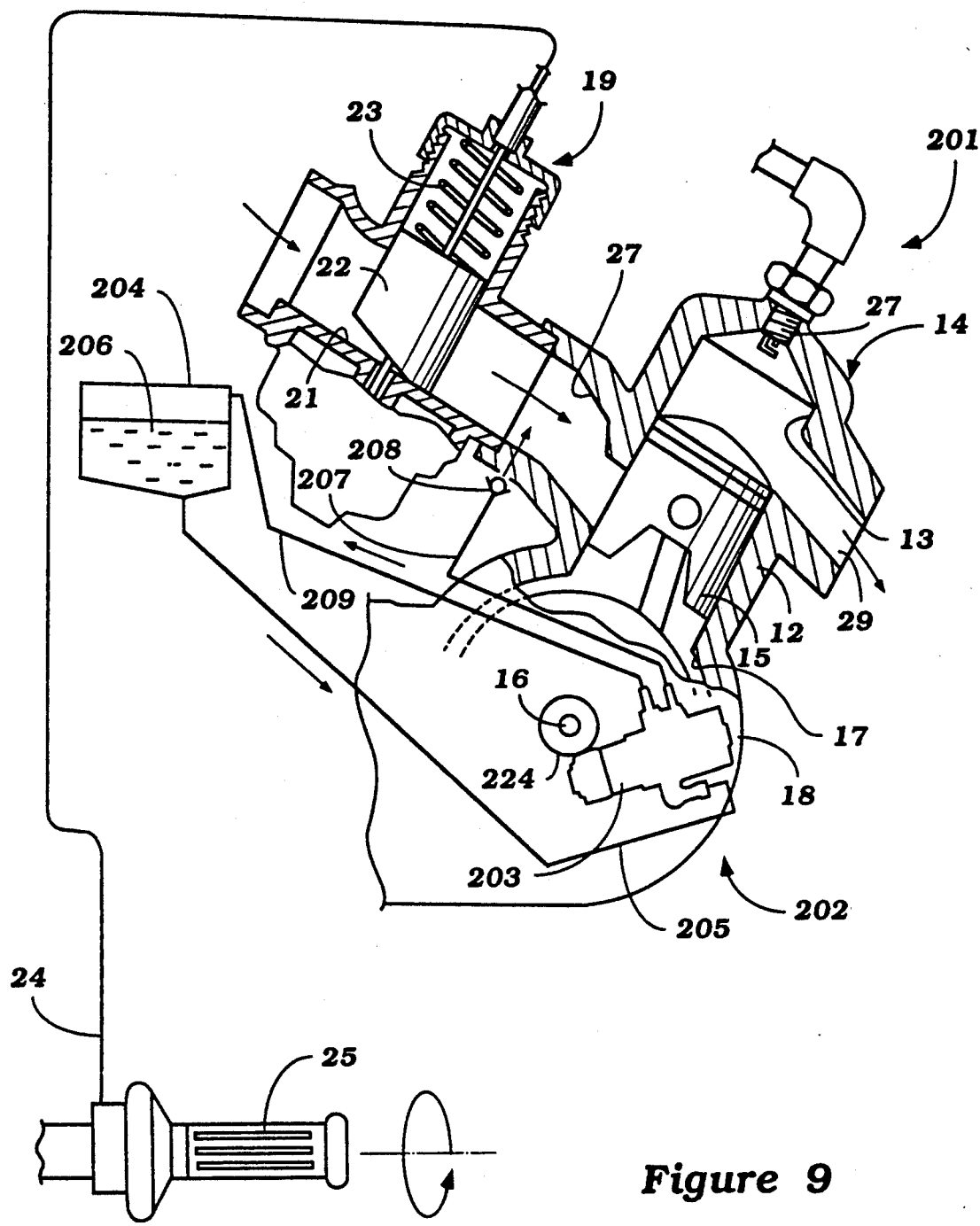
FIG. 9 is a partially schematic side elevational view, with a portion broken away, in part similar to FIG. 1 and shows another embodiment of the invention.
Figure 10:
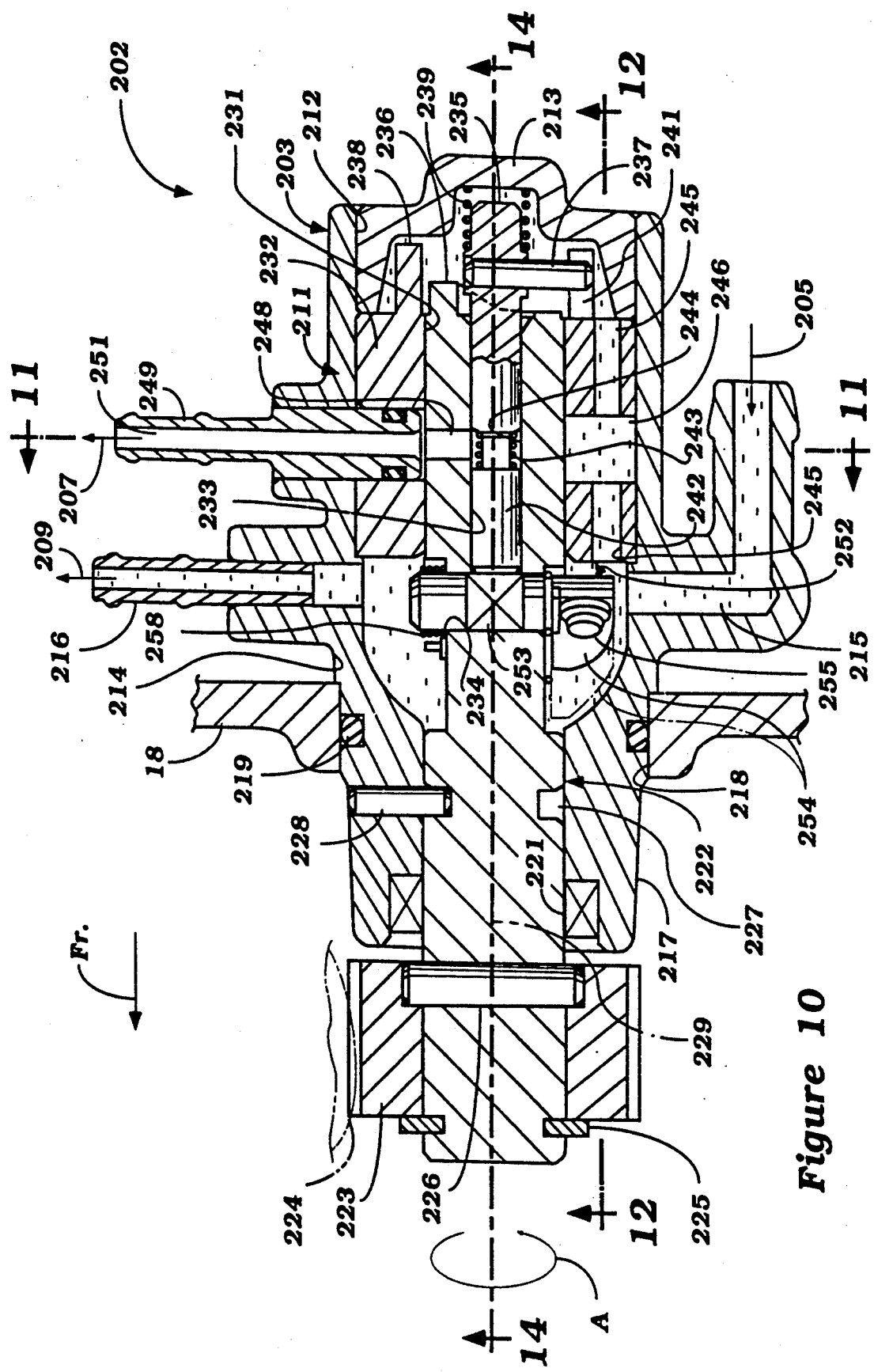
FIG. 10 is a cross sectional view taken through the lubricant pump of this embodiment.

Referring initially to FIG. 9, an engine constructed in accordance with this embodiment is identified generally by the reference numeral 201. The basic construction of the engine 201 is the same as the engine 11 in FIG. 1 and, for that reason, components of this embodiment which are the same as the previously described embodiment have been identified by the same reference numerals and will not be described again. It should be noted that in this embodiment, the exhaust control valve 31 of the previous embodiment is not illustrated. It is to be understood, however, that such an exhaust control valve can be employed in conjunction with this embodiment.

The general lubricating system in this embodiment is identified generally by the reference numeral 202 and includes a lubricating pump 203 which will be described in more detail by particular reference to FIGS. 10 through 14. This lubricant pump 203 receives lubricant from a lubricant reservoir 204 by gravity flow through a supply line 205. The lubricant in the reservoir 204 is indicated by the reference numeral 206. In addition to a delivery line 207 which sprays fuel into the intake passage 201 through a check valve 208, there is provided a vent line 209 which extends from the pump 203 back to the reservoir 204 above the level of the lubricant 206 therein. This vent line 209 will assist in venting air from the lubricant pump 203. It will be noted by the following discussion that this embodiment also, like the previously described embodiments, varies the liquid displacement of the pump 203 by a device which does not change the volume at top dead center and hence the intrusion of air into the system is minimized in the same manner as the previously described embodiments.

It should also be noted from FIG. 9 that the connector 26 of the embodiment of FIG. 1 may be deleted and that there is no external connection from the lubricant pump 203 to any component of the engine other than its a driving connection. Hence, the feedback problems associated with the throttle control 206 of the previous embodiments will not be present in this construction.

Referring now to FIGS. 10 through 14, the construction of the pump 203 will be described in greater detail. The pump 203 includes an outer housing indicated generally by the reference numeral 211 which has a bore 212 that is closed at one end by a closure plug 213 having a pilot portion that is received into the bore 212 with a press fit. A chamber 214 is formed at the end of the bore 212 opposite the closure plug 213 and receives lubricant from the reservoir 204 through the line 205 and an internal fitting 215 formed in the housing member 211. A vent fitting 216 communicates the chamber 214 with the vent line 209 so that air which enters the system will be purged and returned back to the reservoir 204 through the vent line.

Adjacent the chamber 214, the main housing 211 has a pilot portion 217 that penetrates through an opening 218 formed in the crankcase member 18 and which is sealed thereto by means of an O ring seal 219. This pilot portion 217 is formed with a bore 221 which rotatably journals a driving shaft 222 which extends through the bore 221 and has affixed to it a gear 223 that is enmeshed with a gear 224 affixed to the crankshaft 16 so as to establish a driving connection between the crankshaft 16 and the driving shaft 222 of the pump 203.

The gear 223 is axially held on the shaft 222 by means of a snap ring 225 and is coupled for rotation with the shaft 222 by means of a drive pin 226. The driveshaft 222 is driven in the direction of the arrow "A" in FIG. 10. The driveshaft 222 is provided with a circumferential groove 227 into which a locating pin 228 pressed into the housing pilot portion 217 is received for axially locating the driving shaft 222 while permitting its rotation about an axis 229 which is coincident with the axis of the bore 221.

The driving shaft 222 has a cylindrical portion that is received within a bore 231 formed in a sleeve member 232 that is positioned in the housing bore 212 adjacent the closure plug 213. The portion of the driving shaft 222 which is journaled within the sleeve member 232 is formed with a bore 233 which extends through one of its ends and which terminates at a cross bore 234. Because of this construction, the bore 233 may be considered to be a through bore as with the corresponding through bores of the previously described embodiments rather than a blind bore. Thus, the advantages of the previous constructions in this regard are also employed.

A pumping plunger 235 is slidably supported within the outer end of the bore 233 and extends into a cavity formed between the sleeve 232 and the closure member 213. This end of the sleeve 232 is formed with a driving cam 236 which is engaged by a drive pin 237 that is affixed in a cross bore of the pumping plunger 235. A coil compression spring 239 urges the drive pin 237 into engagement with the cam surface 236.

The drive pin 237 and pumping plunger 235 are, however, precluded from rotation by virtue of the fact that the drive pin 237 is received within a groove 241 of a cylindrical extension 238 if the sleeve 232. In this embodiment, the cam 236 and drive pin 237 is configured so as to provide only a single reciprocation per stroke rather than the two reciprocations per stroke as the embodiment of FIGS. 1 through 8. It is to be understood, however, that either pump may be employed with one, two or even more reciprocations per stroke, depending upon the total amount of lubricant desired to be pumped and the number of locations lubricated.

A stop plunger 242 is also slidably positioned in the bore 233 and has a reduced diameter portion 243 that is adapted to engage the pumping plunger 235 so as to limit its stroke, in a manner which will be described. A light coil compression spring 244 is received around the reduced diameter portion 243 and urges the stop plunger 242 into engagement with its driving mechanism, to be described later. The spring 244 is substantially lighter than the spring 239 so that its action on the pumping plunger 235 will not effect movement of the pumping plunger 235 but merely reduces the effect of the spring 239 on the pumping plunger 235.

Fluid is delivered from the chamber 214 to the area between the pumping plunger 235 and the stop plunger 242 by means of a first drilled passage 245 formed in the sleeve 232 which passes through a supply chamber 246 formed intermediately in the sleeve 232 and also communicates this chamber 246 with the chamber in which the cam 236, drive pin 237 and pumping plunger 235 are contained so as to lubricate these components. In addition, a second drilled passageway 247 (FIG. 11) directly communicates the chamber 214 with the chamber formed at the end of the sleeve 232 by the cover plate 213.

Figure 11:
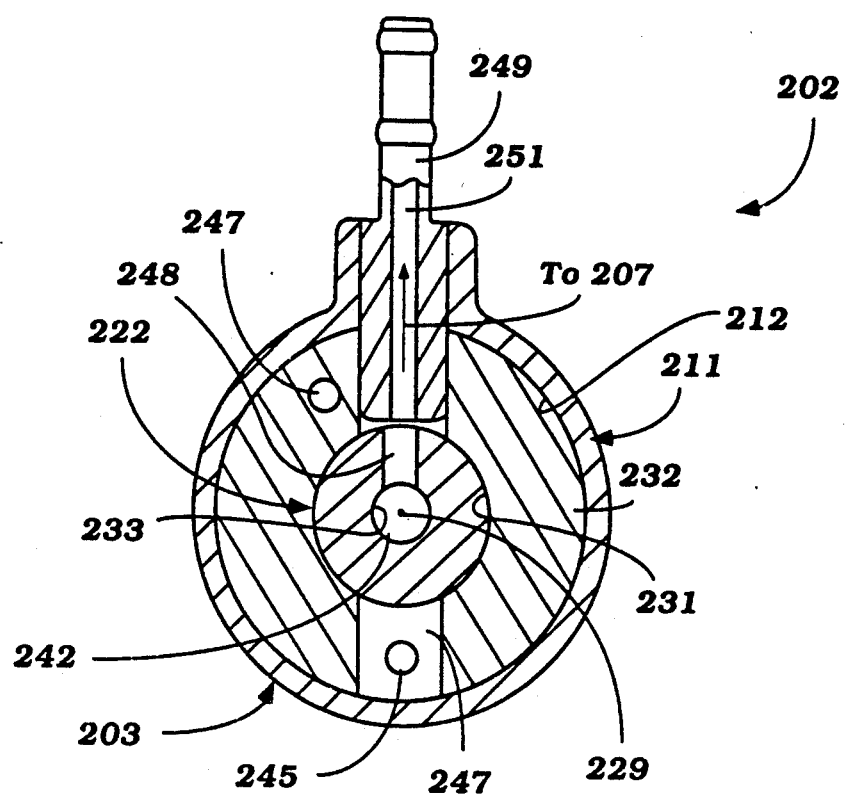
FIG. 11 is a cross sectional view taken along the line 11—11 of FIG. 10.

A distributor passage 248 is formed in the driveshaft 222 and selectively communicates the pumping chamber formed between the pumping plunger 235 and the stop plunger 242 with the supply chamber 246 (see FIG. 11). This registry occurs when the pumping plunger 235 is undergoing its suction stroke. The distributor passage 242 registers with an outlet fitting 249 having a flow passage 251 when the plunger 235 is undergoing its pumping stroke so as to deliver lubricant to the engine through the line 207.

Figure 12:
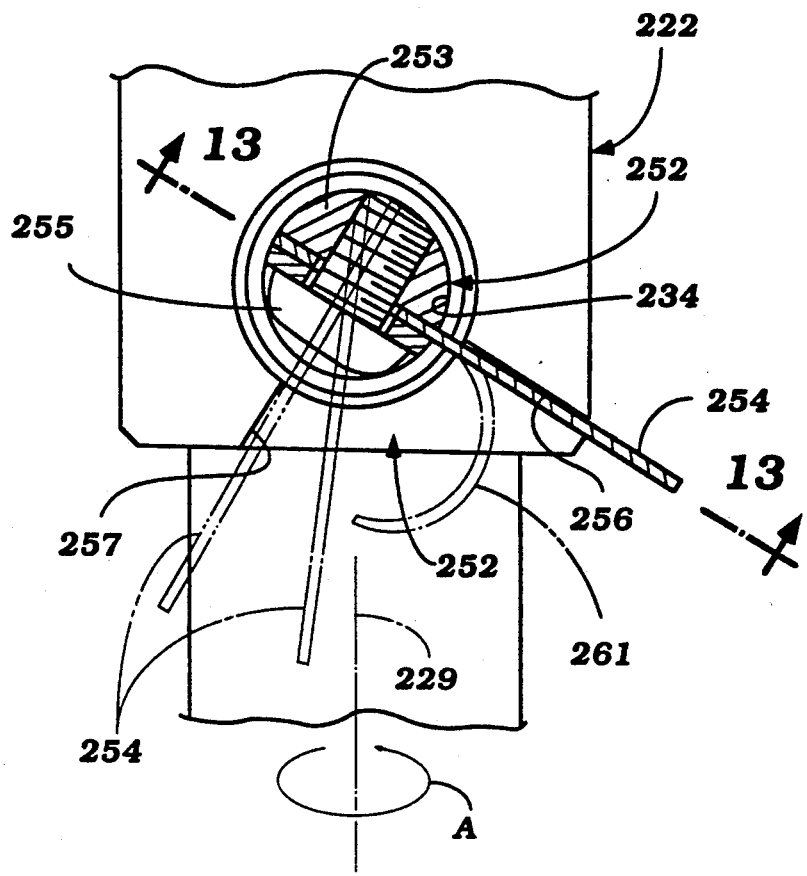
FIG. 12 is a partial cross sectional view taken along the line 12—12 of FIG. 10.
Figure 13:
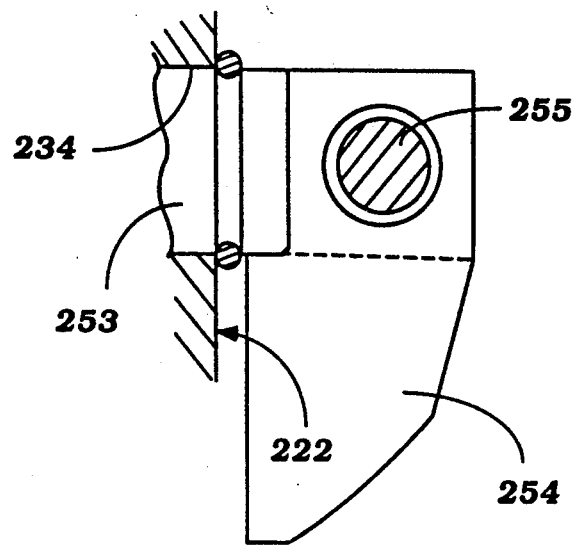
FIG. 13 is a cross sectional view taken along the line 13—13 of FIG. 12.

The mechanism for operating the stop plunger 242 for limiting the stroke of the pumping plunger 235 will now be described in detail by particular reference to FIGS. 10 and 12 through 14. The stop actuating mechanism is indicated generally by the reference numeral 252 and includes a shaft 253 that is rotatably journaled in the transverse bore 234 of the driveshaft 222 previously referred to. One end of the shaft 253 extends into the chamber 214 and has affixed to it a blade 254 by means of a screw 255. The blade 254 is rotatable between a pair of stop surfaces 256 and 257 formed in the shaft 222 (FIG. 12). A torsional spring 258 is affixed between the opposite end of the shaft 253 and the driving shaft 222 (FIG. 10) for normally urging the blade 254 into engagement with the stop surface 256. This is the position when operating at idle or at low speed.

Figure 14:
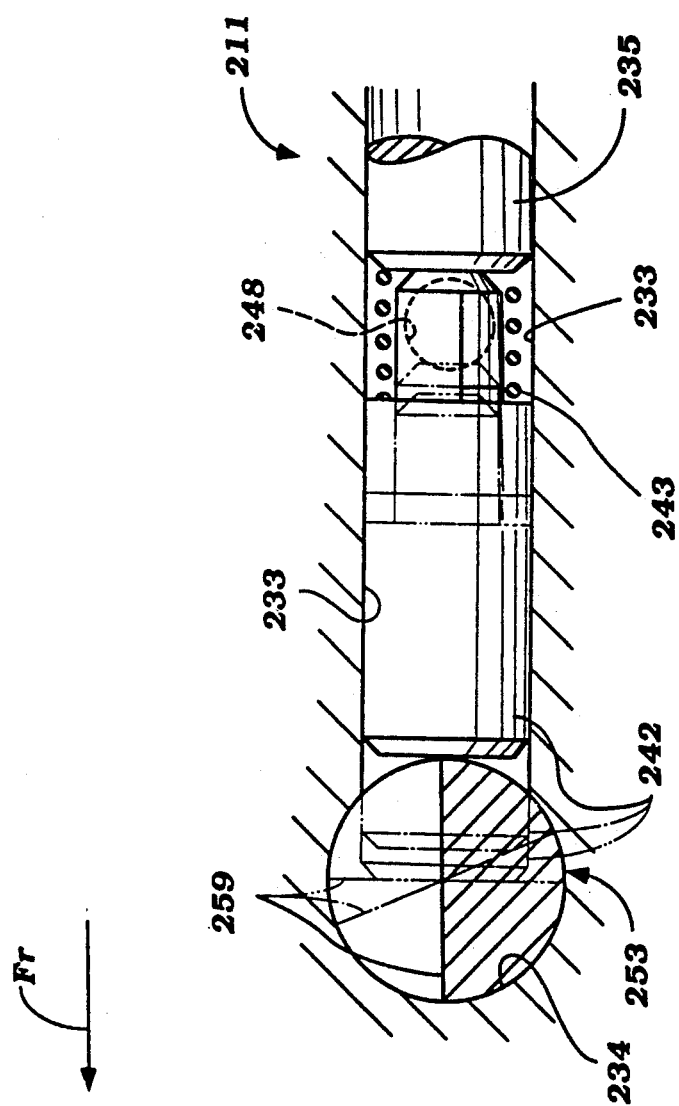
FIG. 14 is a partial cross sectional view taken along a plane perpendicular to the plane of FIG. 10 and shows how the pump stroke is adjusted in this embodiment and is taken generally along the line 14—14 of FIG. 10.

As may be seen in FIG. 14, the shaft 253 is provided with a cam surface defined by a flat section 259 which cooperates with the stop plunger 242 for varying its position. When the spring 258 urges the blade 254 into engagement with the stop 256, the position is as shown in solid lines in FIG. 14 and the stop plunger 242 is at its extreme right hand position so as to limit the stroke of the pumping plunger 235 to its minimum value. However, as the speed of rotation of the driving shaft 222 increases, the viscous resistance caused against the blade 254 will cause it to pivot in a clockwise direction as shown in FIG. 12 and cause the blade 254 to move away from the stop surface 256 toward the stop surface 257. When this movement occurs, the flat 259 will be brought into registry with the end of the stop plunger 242 and the spring 243 will urge the stop plunger 242 in a direction to increase the stroke of the pumping plunger 235. The angular position will depend on the speed of rotation of shaft 222 and will continue until the blade 254 engages the stop surface 257 at a high speed of the engine. By changing the surface area of the blade 254 and the distance between the stops 256 and 257, both the range of pump output and also the shape of the delivery curve may be changed.

In addition to these features, it is also possible to make the stop device 252 temperature responsive. This can be done by making the blade 254 of a bi-metallic or memory responsive material, as shown at 261 in FIG. 12. At a low temperature, the bi-metal blade 261 will achieve a curved configuration and less lubricant will be pumped than at normal temperatures. Of course, variations in the amount of delivery and temperature responsiveness of the device can be changed as desired to suit particular engine conditions.

Figure 15:
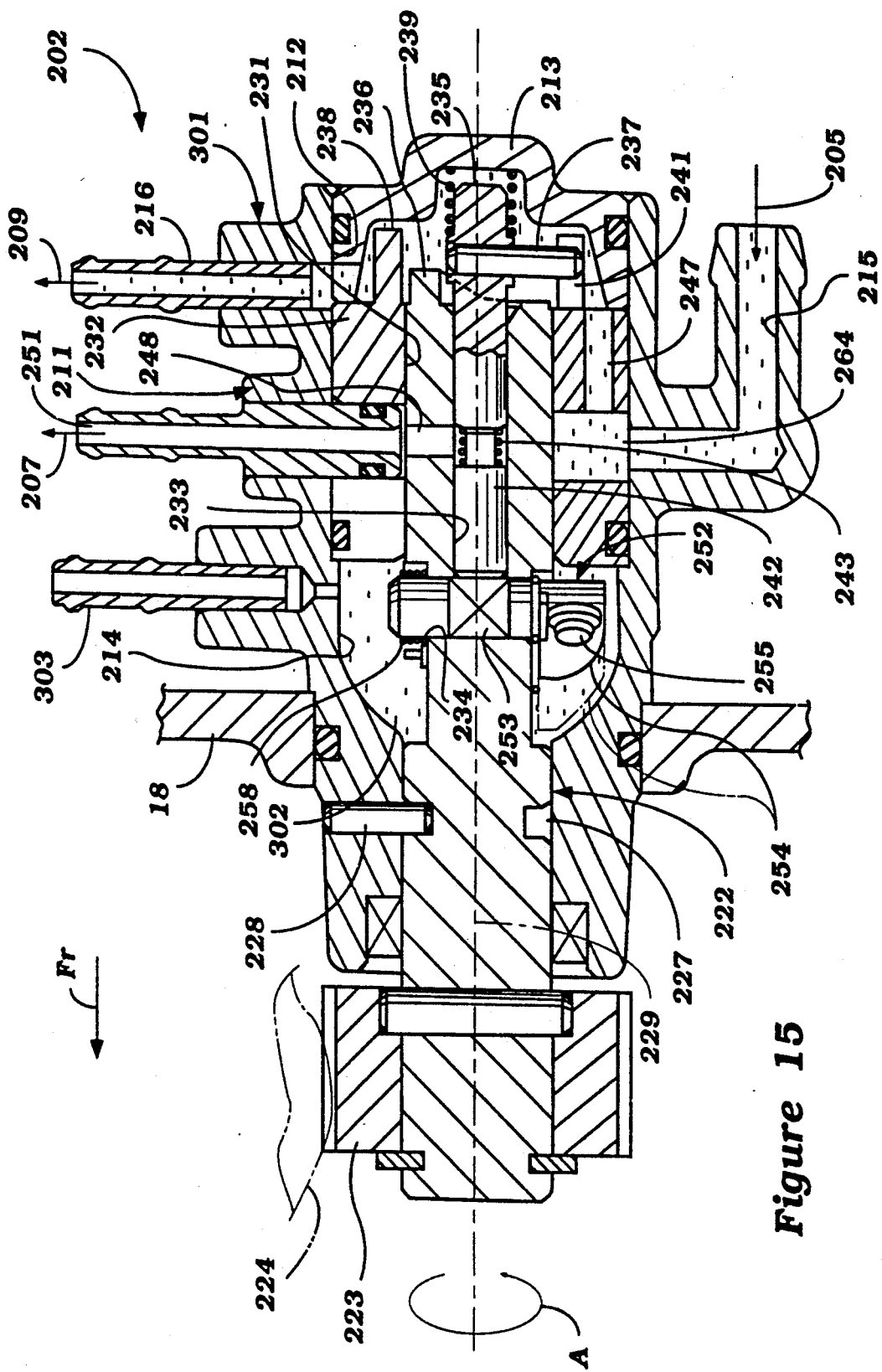
FIG. 15 is a cross sectional view, in part similar to FIG. 10, and shows another embodiment of the invention.

In the embodiment of FIGS. 9 through 14, the viscous liquid operating on the stop controlling mechanism 252 was the same as the lubricant being pumped. In order to provide further tailoring of the delivery curve, a separate fluid having a different viscosity may be employed and FIG. 15 shows how such an embodiment can be constructed. This embodiment is generally the same as the previously described embodiment and, for that reason, components which are the same as those previously described have been identified by the same reference numerals and will not be described again, except insofar as is necessary to understand the construction and operation of this embodiment.

In this embodiment, the pump is indicated generally by the reference numeral 301. Unlike the previously described embodiment, however, the inlet passage 215 communicates directly with the supply chamber 264 and the passageway 245 is eliminated so that the chamber 214 does not communicate with the delivery passage 246. Therefore, the chamber 214 may be filled with a fluid 302 having a different viscosity than the lubricant pump. The bore 233 is appropriately sealed to the stop plunger 242 so as to preclude any leakage of fluid back into the lubricant being pumped. In this event, a breather tube 303 may be provided that is closed by a plug for filling the chamber 214 with the fluid 302. As a result of this, the vent tube 216 is provided to communicate with the area at the end of the sleeve 232 where the cam mechanism 236 is positioned. This will provide air venting from the lubricant as in the previously described embodiment.

In the event the desired delivery curve shape in relation to speed cannot be obtained by altering the viscosity of the fluid in the chamber 214 in accordance with the embodiment of either FIGS. 9 through 14 or FIG. 15 or by changing the size of the blade 254 or volume of this chamber, the equivalent of further viscosity increases can be achieved by placing either a large sphere in the chambers 214 of either embodiment or a plurality of smaller spheres. These will mix with the lubricant and provide a further way of tailoring the delivery curve to changes in speed.

It should be readily apparent from the foregoing description that the described embodiments of the invention are extremely effective in providing effective control of the stroke of the pumping plunger while always maintaining substantially zero clearance volume at top dead center regardless of the amount of lubricant being pumped. Accordingly, air intrusion is substantially avoided and extremely effective control of the amount of lubricant pump is possible. In addition, in the embodiments of FIGS. 10 through 14 and FIG. 15 it is possible to vary the amount of lubricant supplied in a non-linear fashion with respect to engine speed and also to provide temperature compensation in the amount of lubricant pumped without any direct mechanical connection to the engine speed control mechanism. Of course, the foregoing description is that of preferred embodiments of the invention and various changes and modifications may be made without departing from the spirit and scope of the invention, as defined by the appended claims.

I claim:

1. A lubricant pump for pumping only lubricant for lubricating a machine, said pump having a cylinder member defining only a single pumping bore, a pumping plunger reciprocally supported within said bore from one end thereof, means for reciprocating said pumping plunger within said bore, said pumping plunger and said bore defining in part a pumping chamber, means for admitting and discharging fluid from said pumping chamber, and a stop member movably supported within said bore from the opposite end thereof for closing the other end thereof to complete said pumping chamber and for limiting the stroke of said pumping plunger under all engine running conditions to vary the stroke of the pumping plunger and amount of liquid pumped thereby while defining a minimum volume condition between said pumping plunger and said stop member which is the same regardless of the stroke of the pumping plunger set by said stop member.

2. A lubricant pump as set forth in claim 1 wherein the bore is defined by a sleeve open at its opposite ends and wherein the stop member comprises a stop plunger slidably supported within the sleeve.

3. A lubricant pump as set forth in claim 2 further including means for effecting rotation of the sleeve.

4. A lubricant pump as set forth in claim 3 wherein the means for reciprocating the pump plunger comprises a cam formed on the sleeve and cooperating with the pumping plunger for driving the pumping plunger in one direction.

5. A lubricant pump as set forth in claim 1 wherein the machine comprises an internal combustion engine and further including throttle control means for controlling the speed of the engine, said stop member being interrelated with said throttle control means for varying the amount of lubricant supplied to said engine in response to the condition of said throttle control means.

6. A lubricant pump as set forth in claim 5 wherein the stop member has a portion extending beyond the opposite end of the bore to which the throttle control means is connected for controlling the position of the stop member within said bore and the amount of lubricant pumped.

7. A lubricant pump as set forth in claim 6 wherein the bore is defined by a sleeve open at its opposite ends and wherein the stop member comprises a stop plunger slidably supported within the sleeve.

8. A lubricant pump as set forth in claim 7 further including means for effecting rotation of the sleeve.

9. A lubricant pump as set forth in claim 8 wherein the means for reciprocating the pump plunger comprises a cam formed on the sleeve and cooperating with the pumping plunger for driving the pumping plunger in one direction.

10. A lubricant pump for lubricating a machine, said pump having a cylinder member defining a bore, a pumping plunger reciprocally supported within said bore from one end thereof, means for reciprocating said pumping plunger within said bore comprising biasing spring means at said one end of said bore for constantly urging said pumping plunger in a direction toward the other end of said bore, said pumping plunger and said bore defining a pumping chamber, means for admitting and discharging fluid from said pumping chamber, a stop member movably supported within said bore from the opposite end thereof for limiting the stroke of said pumping plunger under the action of said biasing spring means to vary the stroke and amount of liquid pumped thereby, and a drive means positively driven by said engine and located at said one end of said bore for driving said pumping plunger away from engagement with said stop member and for compressing said biasing spring means.

11. A lubricant pump for lubricating a machine, said pump having a cylinder member defining a bore, a pumping plunger reciprocally supported within said bore from one end thereof, means for reciprocating said pumping plunger within said bore, said pumping plunger and said bore defining a pumping chamber, means for admitting and discharging fluid from said pumping chamber, a stop member movably supported within said bore from the opposite end thereof for limiting the stroke of said pumping plunger to vary the stroke and amount of liquid pumped thereby, the amount of lubricant supplied to said machine being varied in response to a specific operating condition of said machine by interconnecting said stop member to a device for controlling the position of said stop member by means responsive to a condition other than said specific operating condition and independently of means for controlling that condition of the machine.

12. A lubricant pump as set forth in claim 11 wherein the machine comprises an engine, the specific operating condition is engine speed, the engine has throttle means for controlling the speed of the engine and the stop member is not connected to the throttle means.

13. A lubricant pump as set forth in claim 12 wherein the means for reciprocating the pumping plunger comprises means for driving the pumping plunger in one direction and biasing spring means for urging the pumping plunger in the opposite direction.

14. A lubricant pump as set forth in claim 13 wherein the biasing means urges the pumping plunger toward the stop member.

15. A lubricant pump as set forth in claim 12 wherein the pumping chamber is defined by the bore, the pumping plunger and the stop member.

16. A lubricant pump as set forth in claim 15 wherein the pumping plunger and the stop member define a minimum volume condition which is the same regardless of the stroke of the pumping plunger.

17. A lubricant pump as set forth in claim 16 wherein the bore is defined by a sleeve open at its opposite ends and wherein the stop member comprises a stop plunger slidably supported within the sleeve.

18. A lubricant pump as set forth in claim 17 further including means for effecting rotation of the sleeve.

19. A lubricant pump as set forth in claim 18 wherein the means for reciprocating the pump plunger comprises a cam formed on the sleeve and cooperating with the pumping plunger for driving the pumping plunger in one direction.

20. A lubricant pump as set forth in claim 19 wherein the means for controlling the portion of the stop member comprises a viscous fluid.

21. A lubricant pump as set forth in claim 20 further including a rotating blade disposed within the viscous fluid and effective to move in response to the speed of rotation within the viscous fluid.

22. A lubricant pump as set forth in claim 21 wherein the viscous fluid comprises the lubricant being pumped.

23. A lubricant pump as set forth in claim 22 further including means for varying the position of the stop member in response to temperature.

24. A lubricant pump as set forth in claim 23 wherein the means for varying the position of the stop member in response to temperature comprises the formation of the blade from a memory responsive material that changes its shape in response to temperature.

25. A lubricant pump as set forth in claim 12 wherein the means for varying the position of the stop member comprises a viscous fluid.

26. A lubricant pump as set forth in claim 25 further including a rotating blade disposed within the viscous fluid and effective to move in response to the speed of rotation within the viscous fluid.

27. A lubricant pump as set forth in claim 26 wherein the viscous fluid comprises the lubricant being pumped.

28. A lubricant pump as set forth in claim 27 further including means for varying the position of the stop member in response to temperature.

29. A lubricant pump as set forth in claim 28 wherein the means for varying the position of the stop member in response to temperature comprises the formation of the blade from a memory responsive material that changes its shape in response to temperature.

30. A lubricant pump for a machine comprised of a member defining a bore, a pumping plunger reciprocating within said bore, supply means for admitting fluid to said bore upon a suction stroke of said pumping plunger, delivery means for delivering fluid from said bore upon a pumping stroke of said pumping plunger, stop means for limiting the stroke of said pumping plunger, and means for controlling the position of said stop means for varying the amount of lubricant pumped for a specific machine operating condition by sensing a condition other than said specific machine operating condition and the means for controlling the specific machine operating condition.

31. A lubricant pump as set forth in claim 30 wherein the machine condition is speed.

32. A lubricant pump as set forth in claim 31 wherein the stop means is controlled without connection to the means that controls the machine's speed.

33. A lubricant pump as set forth in claim 32 wherein the machine comprises an internal combustion engine having a throttle control.

34. A lubricant pump as set forth in claim 33 further including means for varying the condition of the stop means in response to a condition in addition to engine speed.

35. A lubricant pump as set forth in claim 34 wherein the condition other than engine speed is temperature.

36. A lubricant pump as set forth in claim 32 wherein the means for moving the stop member comprises a viscous fluid.

37. A lubricant pump as set forth in claim 36 further including a rotating blade disposed within the viscous fluid and effective to move in response to the speed of rotation within the viscous fluid.

38. A lubricant pump as set forth in claim 37 wherein the viscous fluid comprises the lubricant being pumped.

39. A lubricant pump as set forth in claim 38 further including means for varying the position of the stop member in response to temperature.

40. A lubricant pump as set forth in claim 39 wherein the means for varying the position of the stop member in response to temperature comprises the formation of the blade from a memory responsive material that changes its shape in response to temperature.

41. A lubricant pump as set forth in claim 35 wherein the means for moving the stop member comprises a viscous fluid.

42. A lubricant pump as set forth in claim 41 further including a rotating blade disposed within the viscous fluid and effective to move in response to the speed of rotation within the viscous fluid.

43. A lubricant pump as set forth in claim 42 wherein the viscous fluid comprises the lubricant being pumped.

44. A lubricant pump as set forth in claim 43 wherein the means for varying the position of the stop member in response to temperature comprises the formation of the blade from a memory responsive material that changes its shape in response to temperature.

45. A lubricant pump for lubricating a machine, said pump having a cylinder member journalling a sleeve defining a bore, a pumping plunger reciprocally supported within said bore from one end thereof, means for reciprocating said pumping plunger within said bore, said pumping plunger and said bore defining a pumping chamber, means for admitting and discharging fluid from said pumping chamber, a stop member movably supported within said bore from the opposite end thereof for limiting the stroke of said pumping plunger to vary the stroke and amount of liquid pumped thereby, and means for rotating said sleeve during the operation of said lubricant pump.

46. A lubricant pump as set forth in claim 45 wherein the means for reciprocating the pumping plunger comprises means for driving the pumping plunger in one direction and biasing spring means for urging the pumping plunger in the opposite direction.

47. A lubricant pump as set forth in claim 45 wherein the biasing means urges the pumping plunger toward the stop member.

48. A lubricant pump as set forth in claim 45 wherein the pumping chamber is defined by the bore, the pumping plunger and the stop member.

49. A lubricant pump as set forth in claim 48 wherein the pumping plunger and the stop member define a minimum volume condition which is the same regardless of the stroke of the pumping plunger.

50. A lubricant pump as set forth in claim 47 wherein the means for reciprocating the pump plunger comprises a cam formed on the sleeve and cooperating with the pumping plunger for driving the pumping plunger in one direction.

* * * * *